US009390285B1

(12) United States Patent
Dolas et al.

(10) Patent No.: US 9,390,285 B1
(45) Date of Patent: Jul. 12, 2016

(54) IDENTIFYING INCONSISTENT SECURITY POLICIES IN A COMPUTER CLUSTER

(71) Applicant: Hortonworks, Inc., Santa Clara, CA (US)

(72) Inventors: Sheetal Dinkar Dolas, Sunnyvale, CA (US); Paul Daniel Codding, Richfield, MN (US)

(73) Assignee: Hortonworks, Inc., Santa Clara, CA (US)

( * ) Notice: Subject to any disclaimer, the term of this patent is extended or adjusted under 35 U.S.C. 154(b) by 0 days.

(21) Appl. No.: 15/003,700

(22) Filed: Jan. 21, 2016

Related U.S. Application Data

(60) Provisional application No. 62/173,305, filed on Jun. 9, 2015.

(51) Int. Cl.
*G06F 21/62* (2013.01)
*G06F 17/30* (2006.01)
*H04L 29/06* (2006.01)

(52) U.S. Cl.
CPC ...... *G06F 21/6218* (2013.01); *G06F 17/30289* (2013.01); *H04L 63/102* (2013.01)

(58) Field of Classification Search
CPC .......... G06F 21/6218; G06F 17/30289; G06F 2221/2141; G06F 21/6245; G06F 2221/2111; G06F 21/60; G06F 21/62; G06F 21/629; G06F 21/6227; G06F 21/6209; H04L 63/102; H04L 63/10; H04L 63/101; H04L 63/105; H04L 63/107; H04L 63/108
See application file for complete search history.

(56) References Cited

U.S. PATENT DOCUMENTS

| | | | | |
|---|---|---|---|---|
| 7,730,094 B2 * | 6/2010 | Kaler | ................... | G06F 21/6218 707/785 |
| 2003/0014644 A1 * | 1/2003 | Burns | ................. | H04L 63/0263 713/182 |
| 2006/0288404 A1 * | 12/2006 | Kirshnan | .................. | G06F 8/67 726/5 |
| 2008/0083012 A1 * | 4/2008 | Yu | ........................... | G06F 21/50 726/1 |
| 2008/0104663 A1 * | 5/2008 | Tokutani | ............. | G06F 21/6218 726/1 |
| 2008/0295145 A1 * | 11/2008 | Haswarey | ............. | G06F 21/604 726/1 |
| 2008/0320550 A1 * | 12/2008 | Strassner | ............ | H04L 63/0263 726/1 |
| 2009/0052451 A1 * | 2/2009 | Etheridge | ............... | H04L 63/20 370/392 |
| 2009/0138960 A1 * | 5/2009 | Felty | ................... | H04L 63/0263 726/14 |
| 2011/0263237 A1 * | 10/2011 | Boland | ................. | H04L 63/102 455/418 |
| 2012/0079556 A1 * | 3/2012 | Wahl | ..................... | G06F 21/604 726/1 |
| 2012/0204222 A1 * | 8/2012 | Bodi | ........................ | H04L 63/20 726/1 |
| 2013/0086627 A1 * | 4/2013 | Bryan | ..................... | H04L 63/10 726/1 |
| 2013/0125198 A1 * | 5/2013 | Ferguson | .............. | G06F 21/604 726/1 |
| 2013/0132330 A1 * | 5/2013 | Hurwitz | ................ | G06F 21/604 706/52 |

(Continued)

*Primary Examiner* — Darren B Schwartz
(74) *Attorney, Agent, or Firm* — Fish & Richardson P.C.

(57) ABSTRACT

Methods, systems, and apparatus, including computer programs encoded on computer storage media, for identifying inconsistent security policies. One of the methods includes identifying running software components on a cluster of computers, a first subset of the components managing datasets, a second subset of the components managing other components; identifying entity pairs, each being either: (1) (i) a component paired with (ii) a dataset, or (2) two components paired with each other; determining, for each entity pair, a directed relationship from a first to a second entity, where the first entity is a component, and where the directed relationship represents the first entity executing a type of interaction with the second entity; identifying security policies affecting each entity that each limit user access to a type of interaction; and analyzing, for each entity, entity pairs including the entity and one or more security policies affecting the entity to identify inconsistent security policies.

27 Claims, 3 Drawing Sheets

(56) References Cited

U.S. PATENT DOCUMENTS

| | | | | |
|---|---|---|---|---|
| 2013/0326580 A1* | 12/2013 | Barclay | H04L 63/101 | 726/1 |
| 2013/0340036 A1* | 12/2013 | Furukawa | H04L 63/20 | 726/1 |
| 2014/0282343 A1* | 9/2014 | Parthasarathy | G06F 17/5045 | 716/122 |
| 2014/0282835 A1* | 9/2014 | Guinan | G06F 21/6218 | 726/1 |
| 2015/0012965 A1* | 1/2015 | Furukawa | G06Q 50/10 | 726/1 |

\* cited by examiner

IDENTIFYING INCONSISTENT SECURITY POLICIES IN A COMPUTER CLUSTER

RELATED CASES

This application claims benefit under 35 U.S.C. §119(e) of the filing date of U.S. Provisional Appl. No. 62/173,305, filed Jun. 9, 2015, which is incorporated herein by reference in its entirety.

BACKGROUND

This specification relates to identifying inconsistent security policies in a computer cluster.

A distributed computing framework, e.g., Apache Hadoop, can be deployed to manage distributed storage and distributed processing of large datasets on clusters of many computers, which may be physical or virtual. One computer will be referred to as a node. The framework includes multiple components that can be run on different nodes in the cluster. Each component is responsible for a different task. For example, a first component, e.g., Hadoop Distributed File System (HDFS), can implement a file system, and a second component, e.g., Hive, can implement a database access layer. The components work together to distribute processing of a workload among nodes in the cluster.

Access to components in the cluster can be limited by one or more security policies. Each security policy can restrict access of cluster data or cluster commands to a specified user or computer account.

SUMMARY

In general, this specification describes a system for identifying inconsistent security policies in a computer cluster.

In general, one innovative aspect of the subject matter described in this specification can be embodied in methods that include the actions of identifying a plurality of running software components on a cluster of one or more computers, a first subset of the plurality of components managing one or more datasets stored in the cluster, a second subset of the plurality of components managing other components in the plurality of components; identifying a plurality of entity pairs from the plurality of components and the one or more datasets, each entity pair being either: (1) (i) a component paired with (ii) a dataset, or (2) two components paired with each other; determining, for each entity pair, a respective directed relationship from a first entity in the entity pair to a second entity in the entity pair, wherein the first entity is a component, and wherein the directed relationship represents the first entity executing a type of interaction with the second entity; identifying one or more security policies affecting each entity, where each security policy limits user access to a respective type of interaction by another entity with the entity; and analyzing, for each entity, entity pairs including the entity and one or more security policies affecting the entity to identify inconsistent security policies from the one or more security policies, wherein the inconsistent security policies are policies that allow different scopes of user access to the respective types of interaction.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The method includes generating a recommendation of changes for the inconsistent security policies that cause the one or more security policies to allow identical scopes of user access to the respective types of interaction.

The type of interaction for a particular directed relationship from a first entity to a second entity is one of the following: the first entity exposes data of the second entity, the first entity secures data of the second entity, the first entity temporarily stores data of the second entity, or the first entity stores data of the second entity.

The plurality of components includes a file storage system, a resource manager, a database system, and an operating system.

The analyzing includes, for each entity and for each type of interaction with the entity, identifying, from the entity pairs including the entity, directed relationships to the entity having the type of interaction; identifying, from the one or more security policies, first security policies affecting entities connected to the directed relationships, wherein each first security policy limits user access to the type of interaction with the entity; determining which of the first security policies are less restrictive compared to the others, wherein the determining includes (i) identifying a most restrictive security policy from the first security policies, the most restrictive security policy limiting a scope of user access to a least number of user accounts, and (ii) identifying, from the first security policies, security policies limiting scopes of user access to more than the least number of user accounts to be less restrictive; and identifying the most restrictive security policy and the less restrictive security policies as inconsistent policies.

The analyzing includes, for each entity and for each type of interaction with the entity, identifying, from the entity pairs including the entity, directed relationships to the entity having the type of interaction; determining that one or more first entities connected to the directed relationships has one or more security policies limiting user access to the type of interaction with the entity and one or more second entities connected to the directed relationships does not have a security policy limiting user access to the type of interaction with the entity; and, in response to the determining, identifying the one or more security policies affecting the entity as inconsistent policies.

The method includes generating a recommendation to create security policies for the one or more second entities.

The analyzing includes identifying a first security policy having a first scope limiting user access to a first dataset; identifying a second security policy having a second scope limiting user access to a portion of the first dataset; determining that the first scope is different from the second scope; and, in response to the determining, identifying the first security policy is inconsistent with the second security policy.

The method includes identifying, for each component, a respective plurality of subcomponents; identifying, for each subcomponent, security policies for the subcomponent, each security policy limiting user access to the subcomponent; and analyzing, for each component, each security policy in each subcomponent of the component to determine inconsistent security policies at the component, wherein the inconsistent security policies have differing scopes of user access to subcomponents in the component.

The determining, for each component, inconsistent security policies includes comparing each security policy with the others, which comparing includes identifying a most restrictive security policy from the security policies of the component, the most restrictive security policy limiting a scope of user access to a least number of user accounts; and identifying security policies limiting scopes of user access to more than the least number of user accounts to be less restrictive.

Particular embodiments of the subject matter described in this specification can be implemented so as to realize one or more of the following advantages. Maintaining consistent security profiles across components in a cluster of computers is often complicated because one security change at one component can affect multiple components across the cluster. The system determines inconsistent security policies, or "gaps", that exist across a cluster. The system also determines inconsistent security policies within an individual component of the cluster. Once inconsistencies are identified and prioritized based on ease of exploitation, an administrator can fix the inconsistent security policies to improve security for the cluster, thus preventing private and sensitive data from being accessed unintentionally or maliciously.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
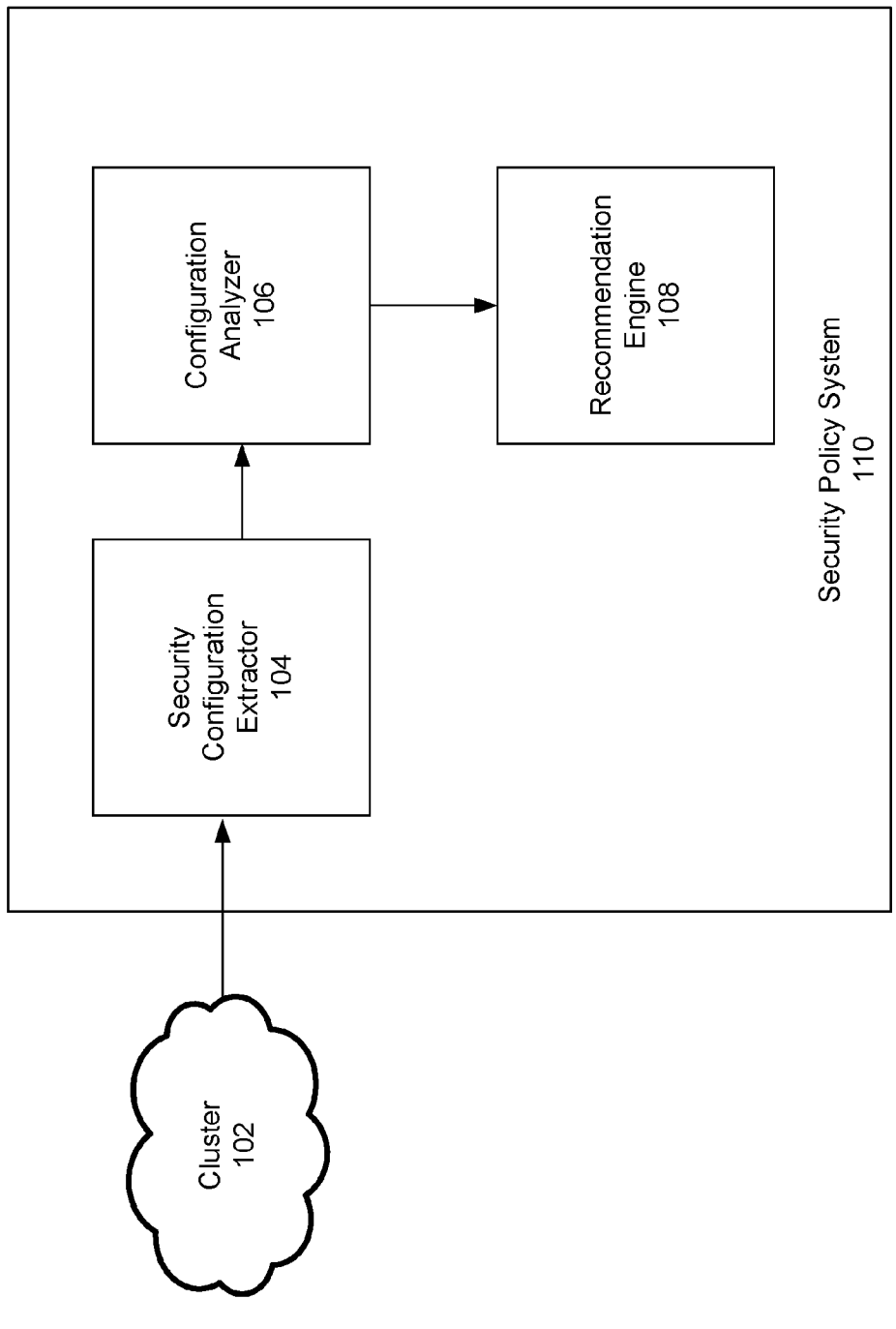
FIG. 1 shows an example system for determining inconsistent security policies in a computer cluster.

FIG. 1 shows an example architecture 100 for a security policy system 110 for identifying inconsistent security policies in a computer cluster 102. The computer cluster 102 includes multiple computers possibly at multiple locations. One computer, whether physical or virtual, is referred to as a node. Each physical computer can include a processor, a memory, e.g., a random access memory (RAM), for storing instructions and data and a processor for executing stored instructions. The memory can include both read only and writable memory. The nodes of the cluster 102 can be coupled to each other through a data communication network, e.g., local area network (LAN) or wide area network (WAN), e.g., the Internet, or a combination of networks. In some implementations, the system is coupled to multiple other clusters.

The nodes in the cluster 102 can run multiple components of a distributed computing framework, e.g., Hadoop, for processing a large workload including one or more datasets. Examples of the multiple components will be described further below with reference to FIG. 3. Oftentimes, the workload is dynamically changing over time. That is, the cluster 102 can have a larger workload to process over a particular month but have a smaller workload to process over a subsequent month. In some implementations, processing a workload includes storing portions of the workload in some nodes of the cluster. The stored portions can also be managed by a component in the distributed computing framework.

When the cluster uses components to process the workload, each component can access one or more other components, e.g., a resource manager component can access a storage capacity of a file system component, or can access the datasets of the workload. Each component can have one or more security policies that restrict access to the datasets, to subcomponents of the component, or to the other components. The restrictions can apply to one or more users or one or more computer accounts.

In some implementations, the security policies for a component are established by an administrator installing or configuring the component in the cluster.

An example security policy for a file system can specify only User A can access data from Table X in the file system. Another security policy for a database access layer can specify only User B can access data from Table X in the database access layer exposing data in the file system. These are two inconsistent security policies, and methods for identifying this inconsistency will be described further below with reference to FIGS. 2-3.

The security policy system 110 has a security configuration extractor 104 that extracts security policies from components in the cluster 102. Because each component can be on one or more nodes, the security policies for components in the cluster can be received from different nodes in the cluster 102.

A configuration analyzer 106 receives the security policies from the security configuration extractor 104. The configuration analyzer 106 can determine directed relationships between the components in the cluster. Using the directed relationships, the configuration analyzer 106 can determine inconsistent security policies in the cluster, which will be described further below with reference to FIGS. 2-3. The terminology inconsistent security policies can refer, i.a., to security policies that are missing or are incomplete.

A recommendation engine 108 generates a recommended user action from the inconsistent security policies that, if implemented, would rectify the inconsistencies. For example, if security policies are missing from particular components, the recommendation engine 108 recommends security policies to be added at the particular components. If security policies are incomplete, the recommendation engine 108 may recommend a less restrictive security policy to match a more restrictive policy, which will be described below.

In some implementations, the extractor 104, the configuration analyzer 106, and the recommendation engine 108 are implemented as one or more software modules or components, running on one or more nodes of the security policy system 110.

Figure 2:
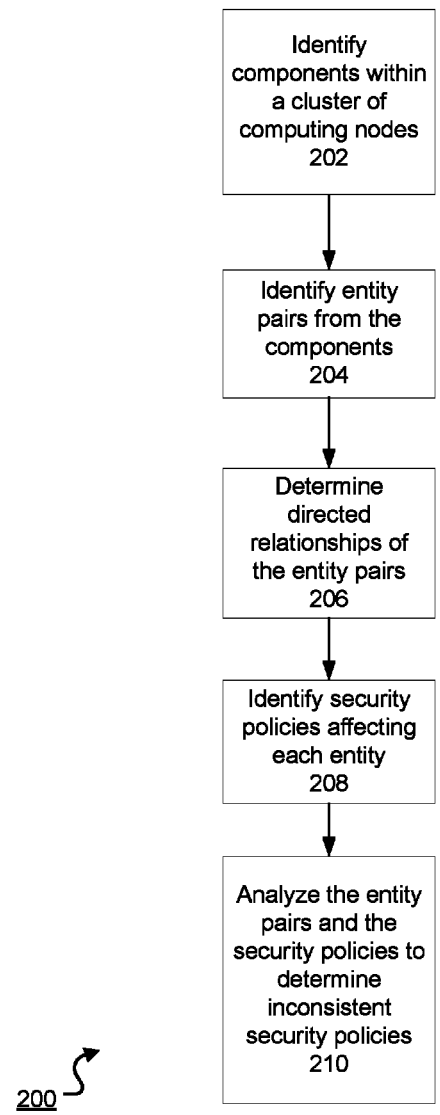
FIG. 2 is a flow diagram of an example method for determining inconsistent security policies across components in a computer cluster.

FIG. 2 is a flow diagram of an example method 200 for identifying inconsistent security policies across components in a computer cluster. For convenience, the method 200 will be described with respect to a system, e.g., the system 110 of FIG. 1, having one or more computers that execute software to implement the method 200.

The system identifies multiple components running on a computer cluster of multiple computing nodes (step 202). Some clusters have a first set of components installed in the nodes, e.g., Hive and HBase, while other clusters have a second unique set of components installed, e.g., Hive, HDFS, and Yet Another Resource Negotiator (YARN). Each cluster can maintain a list of active nodes and components installed in each node of the cluster. The system can identify the components of any given cluster from the maintained list.

The cluster can process a workload having one or more datasets. When processing the workload, the cluster uses a distributed computing framework which causes certain components to access each other and certain components to access the one or more datasets. For example, the YARN component can request utilization metrics from an HDFS component to ensure nodes running the HDFS component are not overloaded. The HDFS component can access the one or more datasets directly for processing. A Hive component can access both the HDFS component and the one or more datasets.

The system identifies entity pairs from the components and one or more datasets (step 204). Each entity pair is either (1) (i) a component paired with (ii) a dataset, or (2) two components paired with each other. The entity pairs are different for clusters having different installed components.

The system can identify the entity pairs from a data structure that maps a directed relationship from a given component to another component or dataset. The mapping can be determined by administrators of the cluster.

The system determines directed relationships from the entity pairs (step 206). The directed relationships can be determined from the mapping. Each directed relationship from a first entity to a second entity represents the first entity executing a type of interaction with the second entity. The first entity can be a component, and the second entity can be a component or a dataset.

A component can execute at least four types of interaction with another entity, i.e., another component or a dataset: (1) the component can expose data of the second entity, (2) the component can secure data of the second entity, (3) the component can temporarily store data of the second entity, or (4) the component can store data of the second entity.

In interaction type (1), when the component exposes data of the second entity, the data is stored at the second entity, but the component provides access to the data, e.g., by responding to query commands.

In interaction type (2), when the component secures data of the second entity, the component provides an additional layer of protection on the data. That is, the component has a feature that restricts access to the data of the second entity. This can be used in addition to security policies for the component.

In interaction type (3), when the component temporarily stores data of the second entity, the component interacts with the second entity, which can cause temporary data from the interaction to be stored in the component, e.g., on the local file system of nodes on which the component is running. The temporary data can include data normally inaccessible through the component itself. For example, if YARN, as the component, has to determine how to distribute processing of the dataset across multiple nodes, YARN can temporarily store portions of the dataset on the nodes running YARN even though YARN does not have the capability to directly expose the dataset, e.g., by responding to a query.

In interaction type (4), when the component stores data of the second entity, the component has received data from the second entity for storage, which the component stores the data on storage devices managed by the component itself.

More examples of directed relationships with different types of interaction between components and datasets will be described with reference to FIG. 3.

The system identifies one or more security policies affecting each entity (step 208). As described above with reference to FIG. 1, the system can use a security configuration extractor, e.g., security configuration extractor 104 of FIG. 1, to extract security policies from the nodes operating each component.

Each security policy limits user access to a respective type of interaction by another entity with the entity. By way of illustration, if a cluster has a first component such as a database access layer installed with a second component, for example, a dataset, the database access layer can execute a type of interaction, for example, exposing data in the dataset. A security policy can cause the database access layer to limit the exposure of data from the dataset to particular users. For example, the security policy on the database access layer can allow only User A to access the dataset, and thus, other users would be unable to access the dataset using the database access layer.

The system analyzes, for each entity, entity pairs including the entity and one or more security policies affecting the entity to determine inconsistent security policies from among the one or more security policies (step 210). The inconsistent security policies allow different scopes of user access to the respective types of interaction. This will be described further with reference to FIG. 3.

Figure 3:
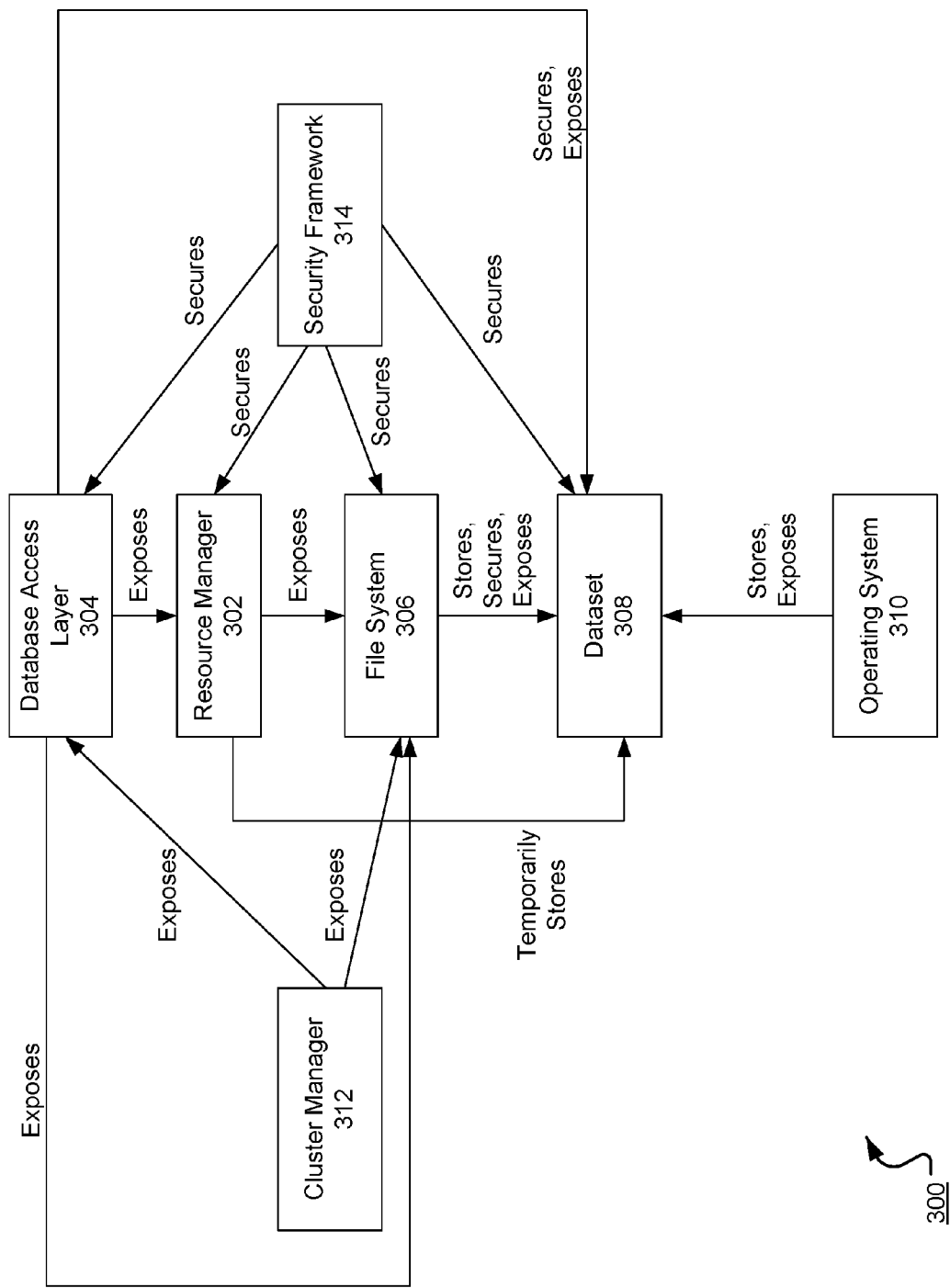
FIG. 3 is a diagram of example directed relationships between components running on the cluster.

FIG. 3 is a diagram 300 of example directed relationships between components running on the cluster and a dataset. The cluster can be programmed to process the workload using the components of the distributed computing framework. Different clusters can have different components installed, and each component can have one or more security policies that limit user access to a type of interaction by another entity with the component.

The graph includes the following entities: components 302-306, 310-314 and a dataset 308. The directed relationships from a first entity to a second entity in the graph represent the first entity executing a type of interaction with the second entity: exposes, stores, secures, or temporarily stores.

By way of illustration, a file system 306 stores, secures, or exposes portions of the dataset 308 for processing. A resource manager 302 temporarily stores the dataset 308 and exposes the file system 306. A security framework 314 secures the dataset 308, the file system 306, the resource manager 302, and a database access layer 304. The database access layer 304 secures and exposes the dataset 308 and exposes the file system 306 and the resource manager 302. A cluster manager exposes the database access layer 304 and the file system 306. An operating system 310, e.g., running on a node in the cluster, stores and exposes the dataset 308.

The cluster can use a configuration analyzer, e.g., the configuration analyzer 106 of FIG. 1, to analyze, for each entity, pairs of entities including the entity and one or more security policies affecting the entity to identify inconsistent security policies from the one or more security policies.

In particular, the configuration analyzer can, for each entity and for each type of interaction with the entity, identify directed relationships to the entity having the type of interaction. For example, for the dataset 308 and for the interaction of exposing data, the configuration analyzer identifies the directed relationships from the file system 306, the operating system 310, and the database access layer 304.

The configuration analyzer can identify a group of security policies affecting entities connected to the identified directed relationships and that also limit user access to the type of interaction with the entity. For example, for the dataset 308 and for the interaction of exposing data, the configuration analyzer identifies the security policies for the dataset 308, file system 306, the operating system 310, and the database access layer 304 that relate to exposing data.

The configuration analyzer determines which of the security policies are less restrictive compared to the others. That is, the configuration analyzer identifies a most restrictive security policy from the first security policies. The most restrictive security policy can limit a scope of user access to a least number of user accounts. For example, if a first security policy allows User A of the operating system 310 to access the dataset 308 and a second security policy allows User A and User B of the file system 306 to access the dataset 308, the first security policy would be the most restrictive security policy because the first security policy limits access to one user while the second security policy limits access to two users. Thus, the configuration analyzer would determine that the second security policy is less restrictive than the first.

The configuration analyzer can identify the most restrictive security policy and the less restrictive security policies as inconsistent policies. In some implementations, a recommendation engine, e.g., the recommendation engine 108 of FIG. 1, generates a recommendation for how to make any less restrictive security policy consistent with the most restrictive security policy.

In some implementations, the configuration analyzer identifies differences of scope between security policies without considering which security policies are more or less restrictive. For example, the configuration analyzer can identify a first security policy having a first scope limiting user access to a first dataset and a second security policy having a different second scope limiting user access to a portion of the first dataset. The configuration analyzer can determine that the first scope is different from the second scope and in response, identify the first security policy is inconsistent with the second security policy.

In some implementations, the configuration analyzer determines that some entities connected to the directed relationships have one or more security policies limiting user access to the type of interaction with the entity and other entities connected to the directed relationships do not have a security policy limiting user access to the type of interaction with the entity. This can indicate that the other entities have missing security policies. Therefore, the configuration analyzer can identify the one or more security policies affecting the entity as inconsistent policies. In some implementations, the recommendation engine generates a recommendation to add the missing security policies to the other entities. The recommendation can be provided to an administrator.

Each component can also have multiple subcomponents. For example, a file system can have a subcomponent that specifies how objects are used, a user interface subcomponent, a manager subcomponent, and a data transfer and protocol subcomponent. Each subcomponent can have one or more security policies that limit user access to the subcomponent.

The configuration analyzer can identify, for each subcomponent in each component, security policies for the subcomponent.

The configuration analyzer can analyze, for each component, each security policy in each subcomponent of the component to determine inconsistent security policies at the component. The inconsistent security policies allow differing scopes of user access to subcomponents in the component.

In the ways described above, the configuration analyzer can determine that security policies are inconsistent by comparing each security policy with each other. The configuration analyzer can identify a most restrictive security policy from the security policies of the component. The most restrictive security policy limits a scope of user access to a least number of user accounts compared to other security policies of the subcomponent. The configuration analyzer identifies security policies limiting scopes of user access to more than the least number of user accounts to be less restrictive. The configuration analyzer identifies the less restrictive and most restrictive security policies as inconsistent.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
    identifying, by a system comprising one or more computer nodes, a plurality of running software components on a cluster of one or more computers, a first subset of the plurality of components managing one or more datasets stored in the cluster, a second subset of the plurality of components managing other components in the plurality of components;
    identifying, by the system, a plurality of entity pairs from the plurality of components and the one or more datasets, each entity pair being either:
        (1) (i) a component paired with (ii) a dataset, or
        (2) two components paired with each other;
    determining, by the system, for each entity pair, a respective directed relationship from a first entity in the entity pair to a second entity in the entity pair, wherein the first entity is a component, and wherein the directed relationship represents the first entity executing a type of interaction with the second entity;
    identifying, by the system, one or more security policies affecting each respective entity, wherein each security policy limits user access to a respective type of interaction by another entity with the respective entity;
    analyzing, by the system, for each entity, entity pairs including the entity and one or more security policies affecting the entity to identify inconsistent security policies from the one or more security policies, wherein the inconsistent security policies are policies that allow different scopes of user access to the respective types of interaction; and
    generating, by the system, a recommendation of changes for the inconsistent security policies that cause the one or more security policies to allow identical scopes of user access to the respective types of interaction.

2. The method of claim 1, wherein the type of interaction for a particular directed relationship from a first entity to a second entity is one of the following: the first entity exposes data of the second entity, the first entity secures data of the second entity, the first entity temporarily stores data of the second entity, or the first entity stores data of the second entity.

3. The method of claim 1, wherein the plurality of components comprises a file storage system, a resource manager, a database system, and an operating system.

4. The method of claim 1, wherein the analyzing comprises, for each entity and for each type of interaction with the said each entity:
    identifying, from the entity pairs including the said each entity, directed relationships to the said each entity having the type of interaction;
    identifying, from the one or more security policies, first security policies affecting entities connected to the directed relationships, wherein each first security policy limits user access to the type of interaction with the said each entity;

determining which of the first security policies are less restrictive compared to the others, wherein the determining comprises:
  identifying a most restrictive security policy from the first security policies, the most restrictive security policy limiting a scope of user access to a least number of user accounts; and
  identifying, from the first security policies, security policies limiting scopes of user access to more than the least number of user accounts to be less restrictive; and
identifying the most restrictive security policy and the less restrictive security policies as inconsistent policies.

5. The method of claim 1, wherein the analyzing comprises, for each entity and for each type of interaction with the said each entity:
  identifying, from the entity pairs including the said each entity, directed relationships to the said each entity having the type of interaction;
  determining that one or more first entities connected to the directed relationships has one or more security policies limiting user access to the type of interaction with the said each entity and one or more second entities connected to the directed relationships does not have a security policy limiting user access to the type of interaction with the said each entity; and
  in response to the determining, identifying the one or more security policies affecting the said each entity as inconsistent policies.

6. The method of claim 5, further comprising generating, by the system, a recommendation to create security policies for the one or more second entities.

7. The method of claim 1, wherein the analyzing comprises:
  identifying a first security policy having a first scope limiting user access to a first dataset;
  identifying a second security policy having a second scope limiting user access to a portion of the first dataset;
  determining that the first scope is different from the second scope; and
  in response to the determining, identifying the first security policy is inconsistent with the second security policy.

8. The method of claim 1, further comprising:
  identifying, by the system, for each component, a respective plurality of subcomponents;
  identifying, by the system, for each subcomponent, security policies for the subcomponent, each security policy limiting user access to the subcomponent; and
  analyzing, by the system, for each component, each security policy in each subcomponent of the component to determine inconsistent security policies at the component, wherein the inconsistent security policies have differing scopes of user access to subcomponents in the component.

9. The method of claim 8, wherein determining, for each component, inconsistent security policies comprises comparing each security policy with the others, the comparing comprising:
  identifying a most restrictive security policy from the security policies of the component, the most restrictive security policy limiting a scope of user access to a least number of user accounts; and
  identifying security policies limiting scopes of user access to more than the least number of user accounts to be less restrictive.

10. A system comprising:
  one or more computers and one or more storage devices on which are stored instructions that are operable, when executed by the one or more computers, to cause the one or more computers to perform operations comprising:
  identifying a plurality of running software components on a cluster of one or more computers, a first subset of the plurality of components managing one or more datasets stored in the cluster, a second subset of the plurality of components managing other components in the plurality of components;
  identifying a plurality of entity pairs from the plurality of components and the one or more datasets, each entity pair being either:
    (1) (i) a component paired with (ii) a dataset, or
    (2) two components paired with each other;
  determining, for each entity pair, a respective directed relationship from a first entity in the entity pair to a second entity in the entity pair, wherein the first entity is a component, and wherein the directed relationship represents the first entity executing a type of interaction with the second entity;
  identifying one or more security policies affecting each respective entity, wherein each security policy limits user access to a respective type of interaction by another entity with the respective entity;
  analyzing, for each entity, entity pairs including the entity and one or more security policies affecting the entity to identify inconsistent security policies from the one or more security policies, wherein the inconsistent security policies are policies that allow different scopes of user access to the respective types of interaction; and
  generating a recommendation of changes for the inconsistent security policies that cause the one or more security policies to allow identical scopes of user access to the respective types of interaction.

11. The system of claim 10, wherein the type of interaction for a particular directed relationship from a first entity to a second entity is one of the following: the first entity exposes data of the second entity, the first entity secures data of the second entity, the first entity temporarily stores data of the second entity, or the first entity stores data of the second entity.

12. The system of claim 10, wherein the plurality of components comprises a file storage system, a resource manager, a database system, and an operating system.

13. The system of claim 10, wherein the analyzing comprises, for each entity and for each type of interaction with the said each entity:
  identifying, from the entity pairs including the said each entity, directed relationships to the said each entity having the type of interaction;
  identifying, from the one or more security policies, first security policies affecting entities connected to the directed relationships, wherein each first security policy limits user access to the type of interaction with the said each entity;
  determining which of the first security policies are less restrictive compared to the others, wherein the determining comprises:
    identifying a most restrictive security policy from the first security policies, the most restrictive security policy limiting a scope of user access to a least number of user accounts; and identifying, from the first security policies, security policies limiting scopes of user access to more than the least number of user accounts to be less restrictive; and identifying the most restrictive security policy and the less restrictive security policies as inconsistent policies.

14. The system of claim 10, wherein the analyzing comprises, for each entity and for each type of interaction with the said each entity:
- identifying, from the entity pairs including the said each entity, directed relationships to the said each entity having the type of interaction;
- determining that one or more first entities connected to the directed relationships has one or more security policies limiting user access to the type of interaction with the said each entity and one or more second entities connected to the directed relationships does not have a security policy limiting user access to the type of interaction with the said each entity; and
- in response to the determining, identifying the one or more security policies affecting the said each entity as inconsistent policies.

15. The system of claim 14, the operations further comprising generating a recommendation to create security policies for the one or more second entities.

16. The system of claim 10, wherein the analyzing comprises:
- identifying a first security policy having a first scope limiting user access to a first dataset;
- identifying a second security policy having a second scope limiting user access to a portion of the first dataset;
- determining that the first scope is different from the second scope; and
- in response to the determining, identifying the first security policy is inconsistent with the second security policy.

17. The system of claim 10, the operations further comprising:
- identifying, for each component, a respective plurality of subcomponents;
- identifying, for each subcomponent, security policies for the subcomponent, each security policy limiting user access to the subcomponent; and
- analyzing, for each component, each security policy in each subcomponent of the component to determine inconsistent security policies at the component, wherein the inconsistent security policies have differing scopes of user access to subcomponents in the component.

18. The system of claim 17, wherein determining, for each component, inconsistent security policies comprises comparing each security policy with the others, the comparing comprising:
- identifying a most restrictive security policy from the security policies of the component, the most restrictive security policy limiting a scope of user access to a least number of user accounts; and
- identifying security policies limiting scopes of user access to more than the least number of user accounts to be less restrictive.

19. One or more non-transitory computer-readable storage media encoded with instructions that, when executed by one or more computers, cause the one or more computers to perform operations comprising:
- one or more computers and one or more storage devices on which are stored instructions that are operable, when executed by the one or more computers, to cause the one or more computers to perform operations comprising:
- identifying a plurality of running software components on a cluster of one or more computers, a first subset of the plurality of components managing one or more datasets stored in the cluster, a second subset of the plurality of components managing other components in the plurality of components;
- identifying a plurality of entity pairs from the plurality of components and the one or more datasets, each entity pair being either:
  (1) (i) a component paired with (ii) a dataset, or
  (2) two components paired with each other;
- determining, for each entity pair, a respective directed relationship from a first entity in the entity pair to a second entity in the entity pair, wherein the first entity is a component, and wherein the directed relationship represents the first entity executing a type of interaction with the second entity;
- identifying one or more security policies affecting each respective entity, wherein each security policy limits user access to a respective type of interaction by another entity with the respective entity;
- analyzing, for each entity, entity pairs including the entity and one or more security policies affecting the entity to identify inconsistent security policies from the one or more security policies, wherein the inconsistent security policies are policies that allow different scopes of user access to the respective types of interaction; and
- generating a recommendation of changes for the inconsistent security policies that cause the one or more security policies to allow identical scopes of user access to the respective types of interaction.

20. The one or more storage media of claim 19, wherein the type of interaction for a particular directed relationship from a first entity to a second entity is one of the following: the first entity exposes data of the second entity, the first entity secures data of the second entity, the first entity temporarily stores data of the second entity, or the first entity stores data of the second entity.

21. The one or more storage media of claim 19, wherein the plurality of components comprises a file storage system, a resource manager, a database system, and an operating system.

22. The one or more storage media of claim 19, wherein the analyzing comprises, for each entity and for each type of interaction with the said each entity:
- identifying, from the entity pairs including the said each entity, directed relationships to the said each entity having the type of interaction;
- identifying, from the one or more security policies, first security policies affecting entities connected to the directed relationships, wherein each first security policy limits user access to the type of interaction with the said each entity;
- determining which of the first security policies are less restrictive compared to the others, wherein the determining comprises:
  - identifying a most restrictive security policy from the first security policies, the most restrictive security policy limiting a scope of user access to a least number of user accounts; and
  - identifying, from the first security policies, security policies limiting scopes of user access to more than the least number of user accounts to be less restrictive; and
- identifying the most restrictive security policy and the less restrictive security policies as inconsistent policies.

23. The one or more storage media of claim 19, wherein the analyzing comprises, for each entity and for each type of interaction with the said each entity:
- identifying, from the entity pairs including the said each entity, directed relationships to the said each entity having the type of interaction;
- determining that one or more first entities connected to the directed relationships has one or more security policies limiting user access to the type of interaction with the said each entity and one or more second entities connected to the directed relationships does not have a security policy limiting user access to the type of interaction with the said each entity; and
- in response to the determining, identifying the one or more security policies affecting the said each entity as inconsistent policies.

24. The one or more storage media of claim 23, the operations further comprising generating a recommendation to create security policies for the one or more second entities.

25. The one or more storage media of claim 19, wherein the analyzing comprises:
- identifying a first security policy having a first scope limiting user access to a first dataset;
- identifying a second security policy having a second scope limiting user access to a portion of the first dataset;
- determining that the first scope is different from the second scope; and
- in response to the determining, identifying the first security policy is inconsistent with the second security policy.

26. The one or more storage media of claim 19, the operations further comprising:
- identifying, for each component, a respective plurality of subcomponents;
- identifying, for each subcomponent, security policies for the subcomponent, each security policy limiting user access to the subcomponent; and
- analyzing, for each component, each security policy in each subcomponent of the component to determine inconsistent security policies at the component, wherein the inconsistent security policies have differing scopes of user access to subcomponents in the component.

27. The one or more storage media of claim 26, wherein determining, for each component, inconsistent security policies comprises comparing each security policy with the others, the comparing comprising:
- identifying a most restrictive security policy from the security policies of the component, the most restrictive security policy limiting a scope of user access to a least number of user accounts; and
- identifying security policies limiting scopes of user access to more than the least number of user accounts to be less restrictive.

* * * * *